(12) United States Patent
Schriever (10) Patent No.: US 11,812,703 B2
(45) Date of Patent: Nov. 14, 2023

(54) BACKPACK BLOWER WITH IMPROVED STARTING MECHANISM

(71) Applicant: Husqvarna AB, Huskvarna (SE)

(72) Inventor: Robert Schriever, Concord, NC (US)

(73) Assignee: HUSQVARNA AB, Huskvarna (SE)

( * ) Notice: Subject to any disclaimer, the term of this patent is extended or adjusted under 35 U.S.C. 154(b) by 738 days.

(21) Appl. No.: 16/691,102

(22) Filed: Nov. 21, 2019

(65) Prior Publication Data

US 2021/0153444 A1 May 27, 2021

(51) Int. Cl.
*A01G 20/47* (2018.01)
*A45F 3/14* (2006.01)

(52) U.S. Cl.
CPC .............. *A01G 20/47* (2018.02); *A45F 3/14* (2013.01)

(58) Field of Classification Search
CPC ... A01G 20/47; A45F 3/14; A47L 5/14; B25F 5/00; B25F 5/001; E01H 1/08; E01H 1/0809
USPC ........................................................ 15/405
See application file for complete search history.

(56) References Cited

U.S. PATENT DOCUMENTS

| 6,901,900 | B2 | 6/2005 | Matsubayashi et al. |
| 2003/0056746 | A1 | 3/2003 | Tezuka et al. |
| 2018/0045158 | A1 | 2/2018 | Densborn et al. |
| 2019/0045725 | A1* | 2/2019 | Shangguan ............ A01G 20/40 |
| 2019/0159409 | A1* | 5/2019 | Hoffman ................ A01G 20/47 |

FOREIGN PATENT DOCUMENTS

| JP | 2005048669 A | 2/2005 |
| WO | 2017160241 A1 | 9/2017 |

OTHER PUBLICATIONS

"Stihl Backpack Blowers," Retrieved from https://www.gustharts.com/machinery-c123/blowers-and-vacuums-c225/blowers-c238/backpack-blowers-c229/stihl-br-800-c-e-p2523.

* cited by examiner

Primary Examiner — Katina N. Henson
(74) Attorney, Agent, or Firm — BURR & FORMAN LLP (57) ABSTRACT

A starting assembly for a backpack blower may include a starting lever. The backpack blower may include an engine and a backpack harness configured to support the blower on a back of a user wearing the backpack harness. The starting lever may include a lever arm operably coupled to an axial member at a distal end of the axial member. The starting lever may be pivotable about an axis formed by the axial member by a user wearing the blower via the backpack harness to start the engine.

21 Claims, 10 Drawing Sheets

BACKPACK BLOWER WITH IMPROVED STARTING MECHANISM

TECHNICAL FIELD

Example embodiments generally relate to outdoor power equipment and, more particularly, relate to a backpack blower with an improved starting mechanism.

BACKGROUND

Outdoor power equipment includes such devices as mowers, trimmers, edgers, chainsaws, blowers and the like. These devices are often used to perform tasks that inherently require the devices to be mobile. Accordingly, these devices are typically made to be relatively robust and capable of handling difficult work in hostile environments, while balancing the requirement for mobility.

Powering such devices could be accomplished in any number of ways. However, for outdoor power equipment that is intended to be carried by operators, petrol or gasoline engines are popular choices due to their power, range, and longevity. However, particularly for larger or more powerful engines, size and weight become important considerations. In this regard, for example, for blowers that are powered by gasoline or petrol engines it is common to place the blower on a backpack assembly so that the operator can carry the weight of the device on his/her back. This makes carrying the device much easier, and the blower tube is typically then able to be directed quite easily by the operator.

Although such backpack blower devices are very popular, those that are powered by gasoline or petrol engines have a distinct disadvantage when it comes to starting the engine. In this regard, engine starting is typically performed using a starter knob and recoil starter. The recoil starter includes a rope that is coiled on a reel and has the starter knob at a distal end of the rope. The operator pulls the starter knob and uncoils the rope. This uncoiling tensions a spring that is operably coupled to the reel, engages the clutch and turns the crank shaft to crank or start the engine.

This method of starting the engine (i.e., recoil starting) is very common, and is generally suggested to be accomplished while the blower is located on the ground. After the engine is started, the backpack may be put on the operators back and blowing operations may begin. For initial (cold) starting, the use of the recoil starter and starting before placing the blower on the operator's back may be both familiar, uncomplicated and not inconvenient. However, if the operator shuts down the blower for a short period of time (e.g., to reposition, to have a conversation or to take a short break), the use of a recoil starter may require removing the backpack before the blower can be restarted. This potential for repeated donning and doffing of the backpack to restart the blower can be very annoying and inefficient. Moreover, even if the operator could reach the recoil starter to attempt to start the engine with the backpack still donned, less than optimal results may be achieved. Thus, it may be desirable to develop an alternative starting method that could be performed without doffing the backpack.

BRIEF SUMMARY OF SOME EXAMPLES

Some example embodiments may therefore provide a relatively easy, convenient and effective starting mechanism that can be used without doffing the backpack.

In accordance with an example embodiment, a blower may be provided. The blower may include a housing, a backpack harness operably coupled to the housing to support the blower on a back of a user wearing the backpack harness, an engine operably coupled to the housing, a fan assembly operably coupled to the engine to force air through a blower tube responsive to operation of the engine, and a starting assembly comprising a starting lever that is pivotable by a user wearing the blower via the backpack harness to start the engine.

In another example embodiment, a starting assembly for a backpack blower may be provided. The starting assembly may include a starting lever. The backpack blower may include an engine and a backpack harness configured to support the blower on a back of a user wearing the backpack harness. The starting lever may include a lever arm operably coupled to an axial member at a distal end of the axial member. The starting lever may be pivotable about an axis formed by the axial member by a user wearing the blower via the backpack harness to start the engine.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide an improved starting mechanism for a backpack blower. In this regard, some example embodiments may provide for the inclusion of a lever or other operable member that is easy to reach and operate while the blower remains on the back of the user. The user is therefore not required to doff the backpack blower before starting the engine. As a result, users may find operability of the backpack blower to be enhanced, and the user experience may also be improved.

Figure 1:
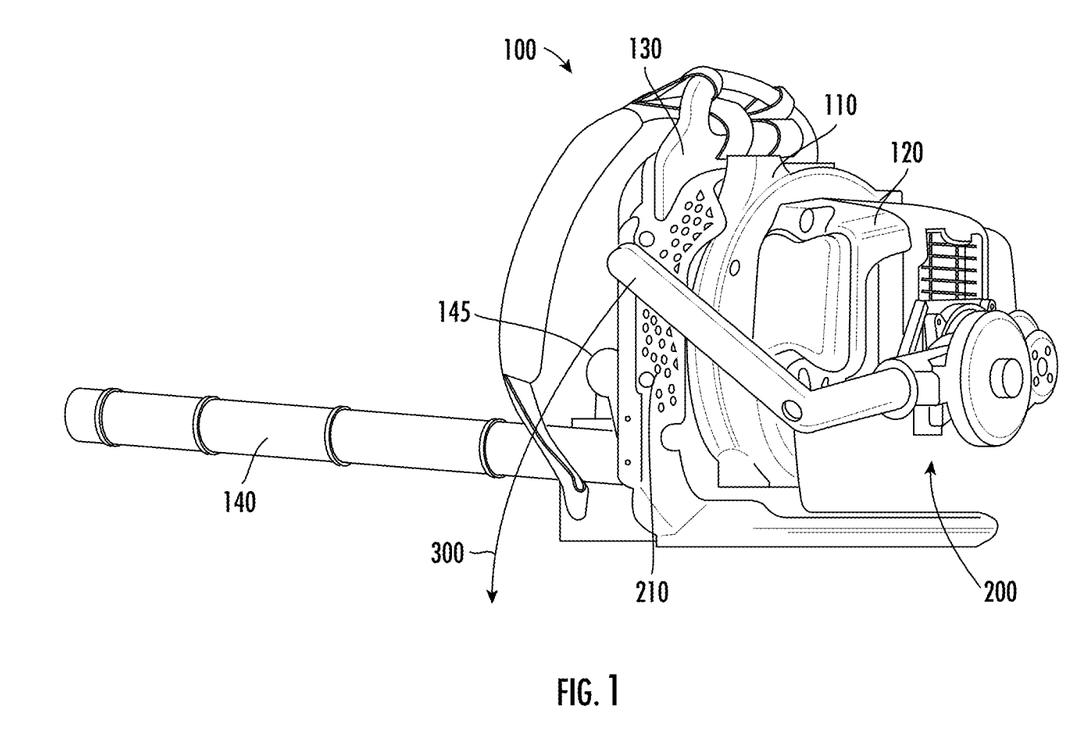
FIG. 1 illustrates a perspective side view of a blower having a starting assembly in accordance with an example embodiment.

FIG. 1 illustrates a perspective side view of a backpack blower (hereinafter simply referred to as blower 100) in accordance with an example embodiment. Referring to FIG. 1, the blower 100 may include a housing 110 inside which various components of the blower 100 are housed. The blower 100 may further include a engine 120 or power unit for providing the driving force to move air through the blower 100. In this regard, the operation of the engine 120 may in turn power a fan assembly that drives air out of the blower 100. In some embodiments, the power unit may be a gasoline or petrol engine that may be housed in the housing 110. The housing 110 may be worn on the operator's back and supported via a backpack harness 130.

The housing 110 may be formed of plastic, composite materials, metals or any other desirable materials. The backpack harness 130 may include shoulder straps and support structures that integrate with, provide a support platform for, or otherwise enable the weight of the housing 110 and the engine 120 to be carried by the backpack harness 130 while the user has donned the blower 100. The user can slip the shoulder straps of the backpack harness 130 off in order to doff the blower 100.

In an example embodiment, the blower 100 may further include a blower tube 140 that is operably coupled to the fan assembly via a flexible hose. Air driven through the fan assembly may be output into the hose and then be directable via the blower tube 140 by manual pointing of the blower tube 140 by the user. In some cases, the blower tube 140 may include a handle 145 that, in some cases, may include a trigger that may be operated by a finger of the user while the user holds the handle 145. Actuation of the trigger may cause power from the engine 120 to turn the fan assembly and drive air through the blower 100.

As discussed above, starting of the blower 100 would normally require doffing the blower 100 and placing the blower 100 on the ground while pulling a recoil starter. Example embodiments may replace the recoil starter with a starting mechanism (e.g., starting assembly 200) of an example embodiment. The starting assembly 200 includes a starting lever 210 that is reachable and operable by the user while the user is still wearing the blower 100 on his/her back. Thus, for example, the starting lever 210 may have a structure that enables operation while the blower 100 is being worn.

When being worn, the blower 100 may be oriented so that the backpack harness 130 contacts a back of the user. For referential purposes, the user's back may be against a front of the blower 100 and the starting assembly 200 may generally be located at the back of the blower 100. Forward and rearward directions may therefore be determined in relation to this reference guide. The front portion of the backpack harness 130 may therefore be relatively flat while resting against the back of the user while the blower 100 is being worn. Thus, for example, the front portion of the backpack harness 130 may define an interface plane at which the user's back is encountered. In some cases, the starting lever 210 may pass through the interface plane to be reachable by the user while the user has donned the blower 100.

Figure 2:
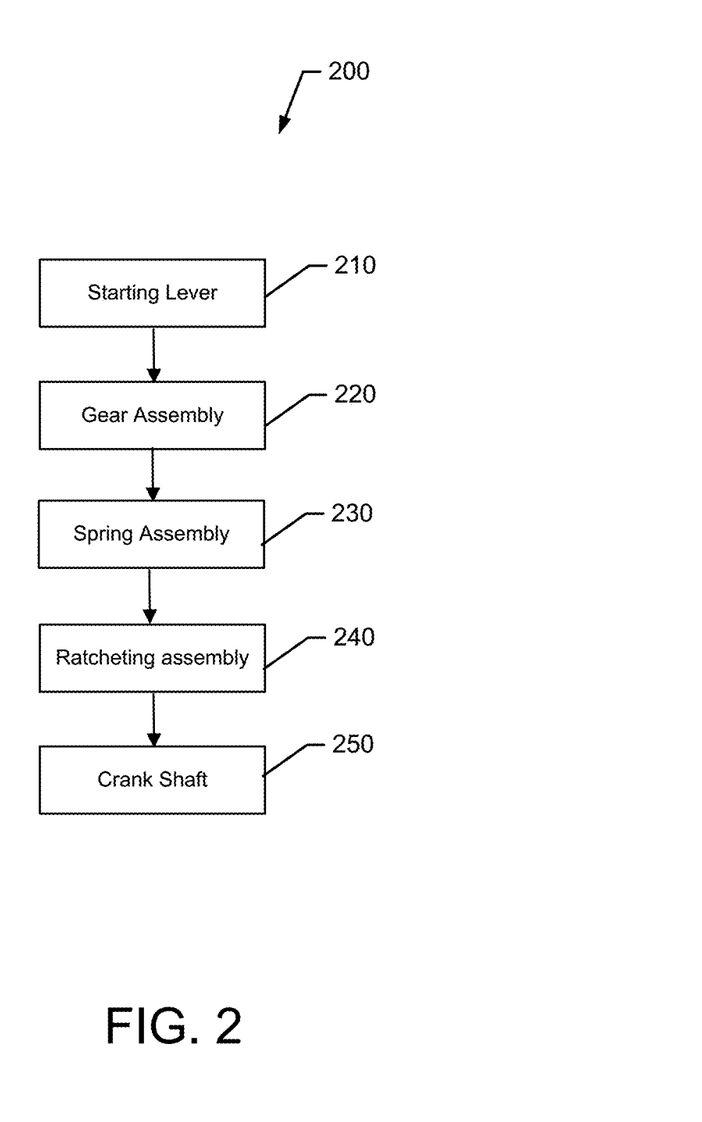
FIG. 2 illustrates a block diagram of the starting assembly of an example embodiment.
Figure 3:
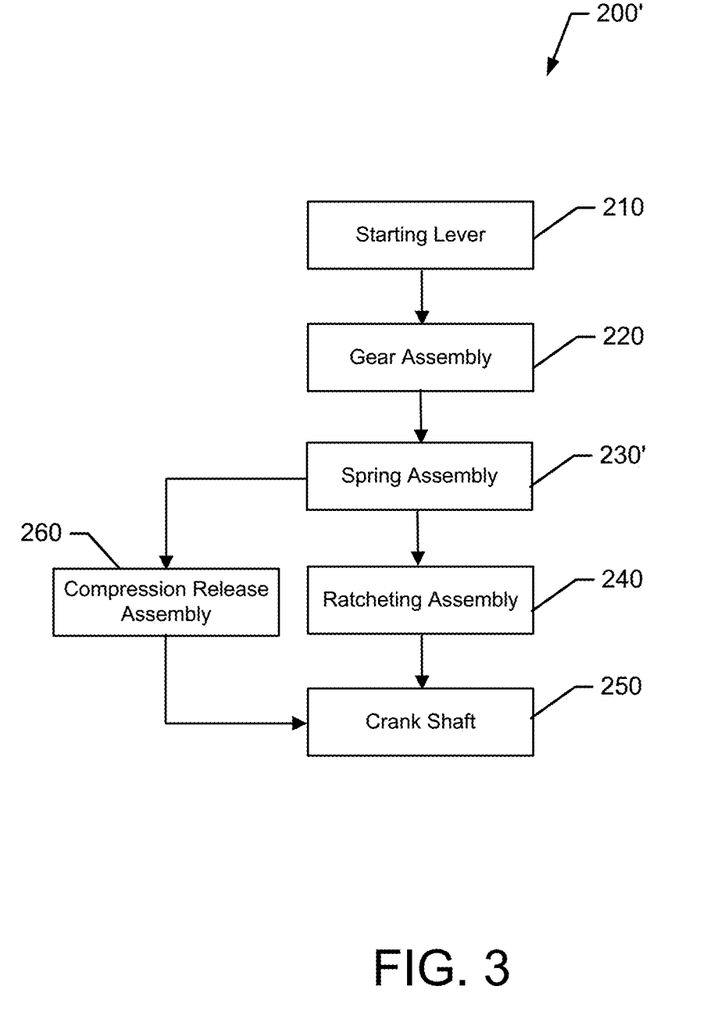
FIG. 3 illustrates a block diagram of a slightly modified version of the starting assembly, which is configured for easier starting, in accordance with an example embodiment.
Figure 4:
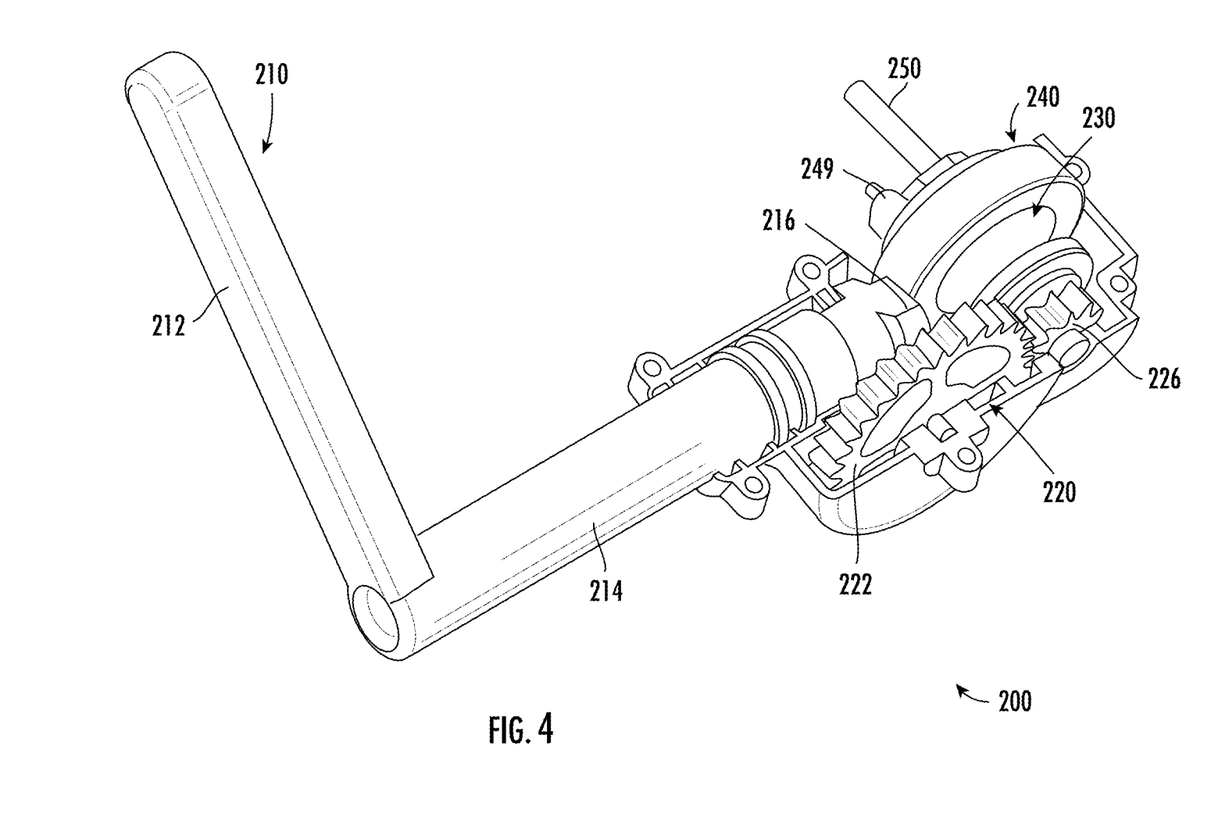
FIG. 4 illustrates a perspective view of various components of the starting assembly with some housing portions removed by taking a cross section through various cover components to enable viewing access to certain components inside in accordance with an example embodiment.
Figure 5:
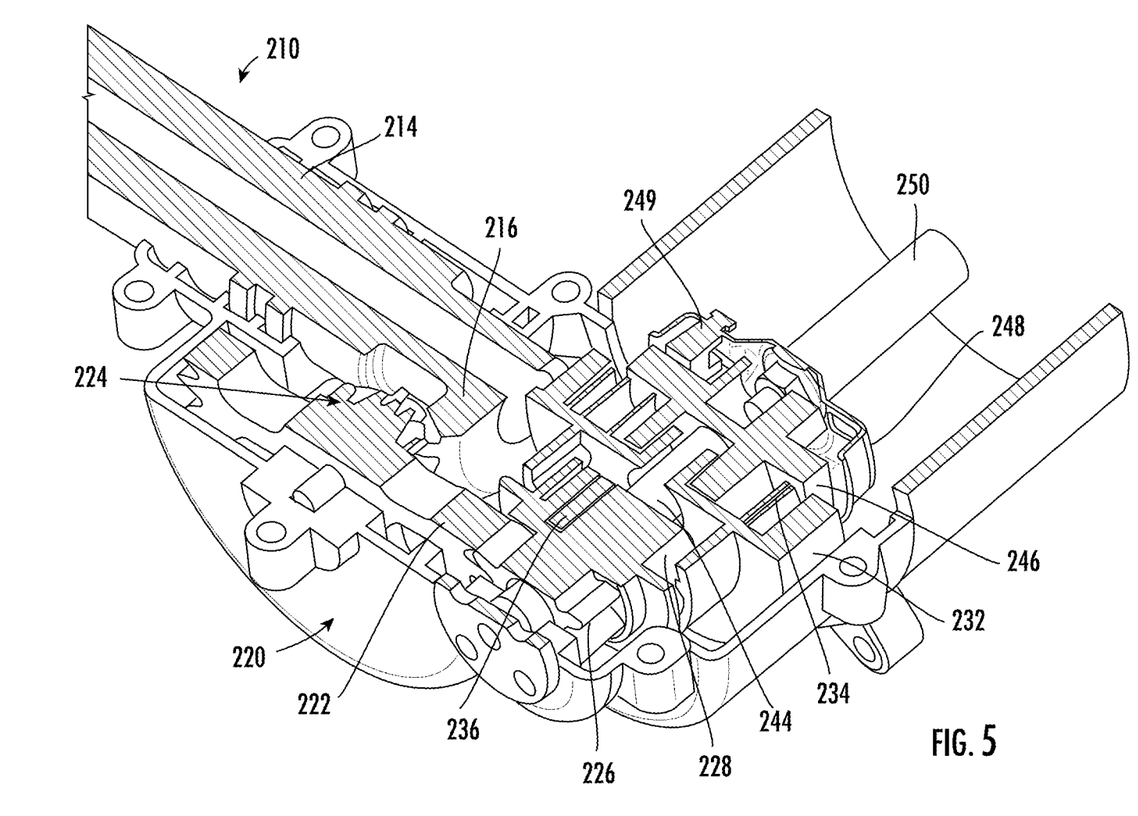
FIG. 5 illustrates a shift in perspective relative to FIG. 4, but is otherwise a cross section view taken along the same cross section plane from FIG. 4 in accordance with an example embodiment.
Figure 6:
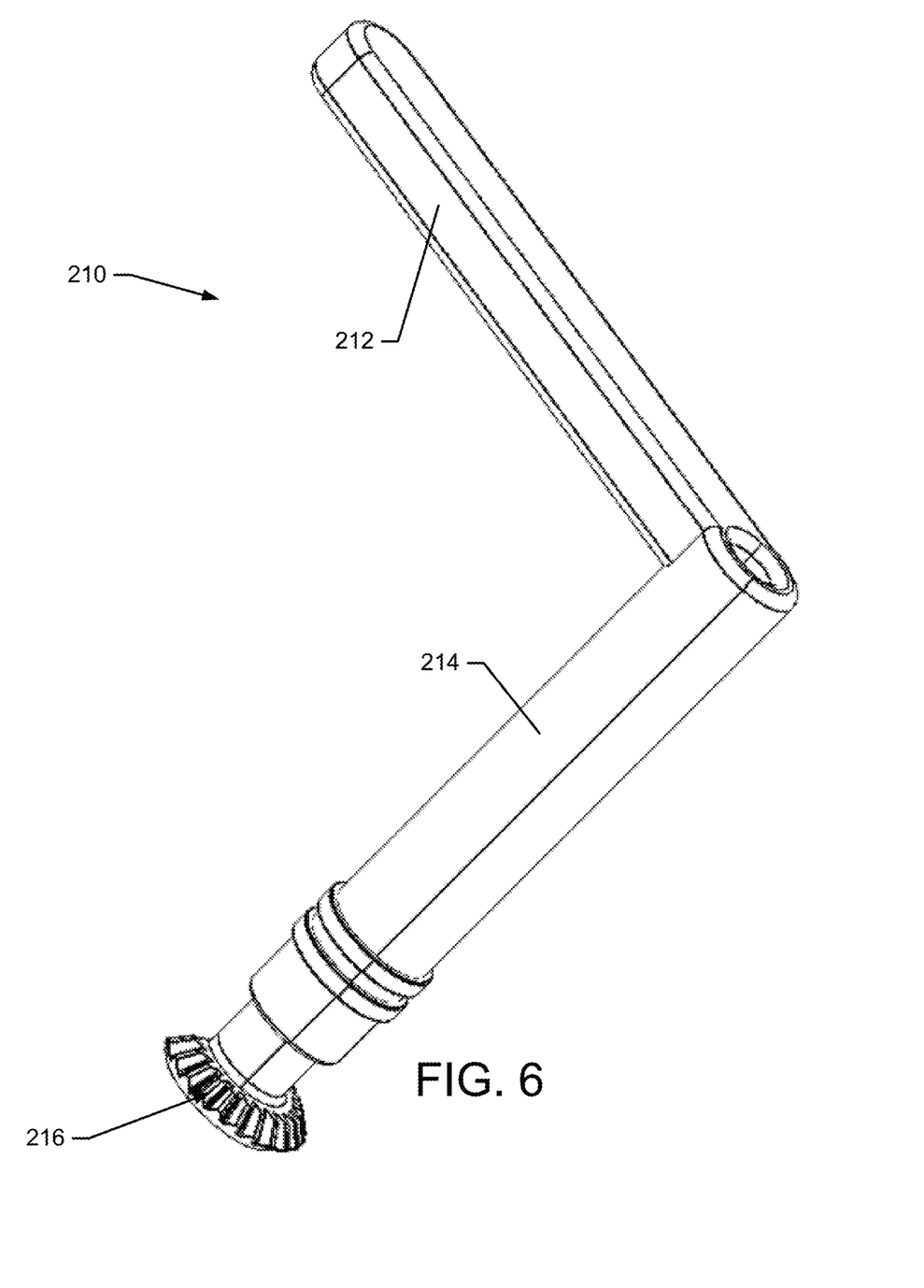
FIG. 6 illustrates a perspective view of a starting lever of the starting assembly of an example embodiment.
Figure 7:
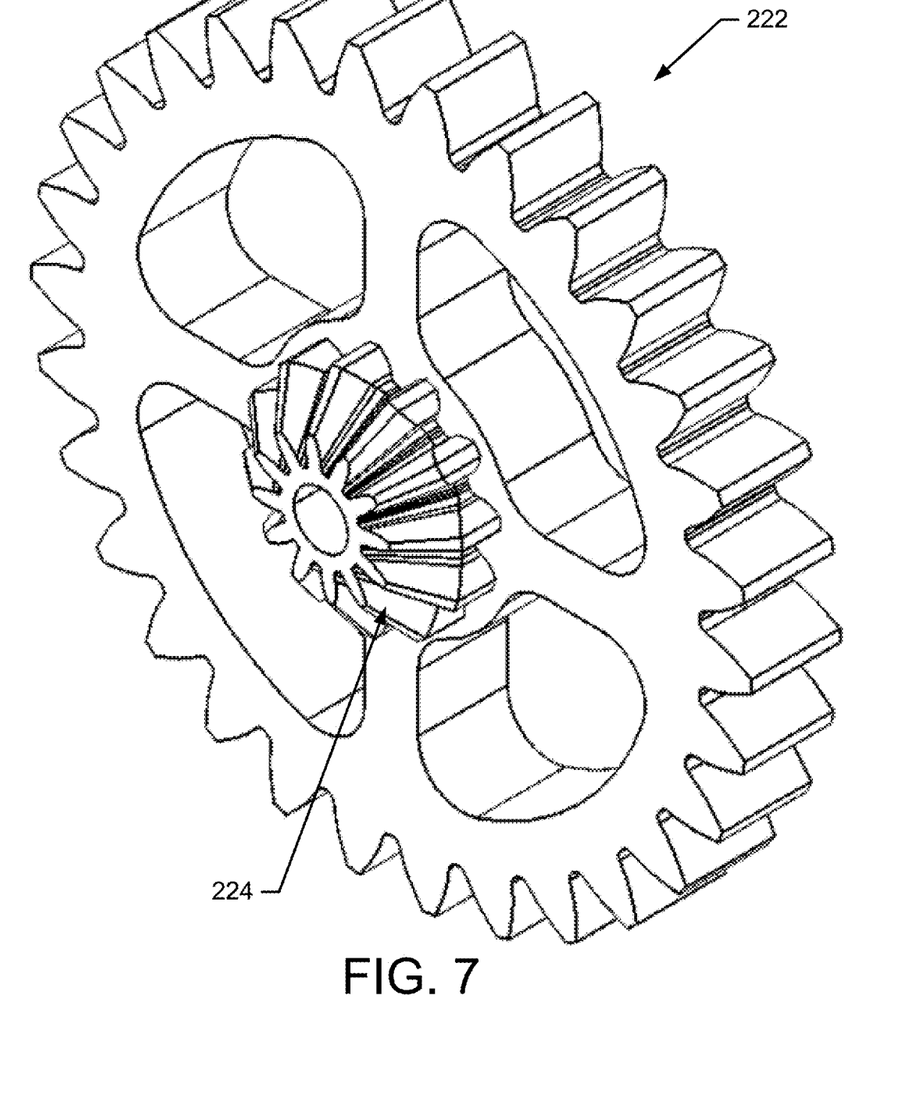
FIG. 7 illustrates a perspective view of a bull gear from a gear assembly of the starting assembly in accordance with an example embodiment.
Figure 8A:
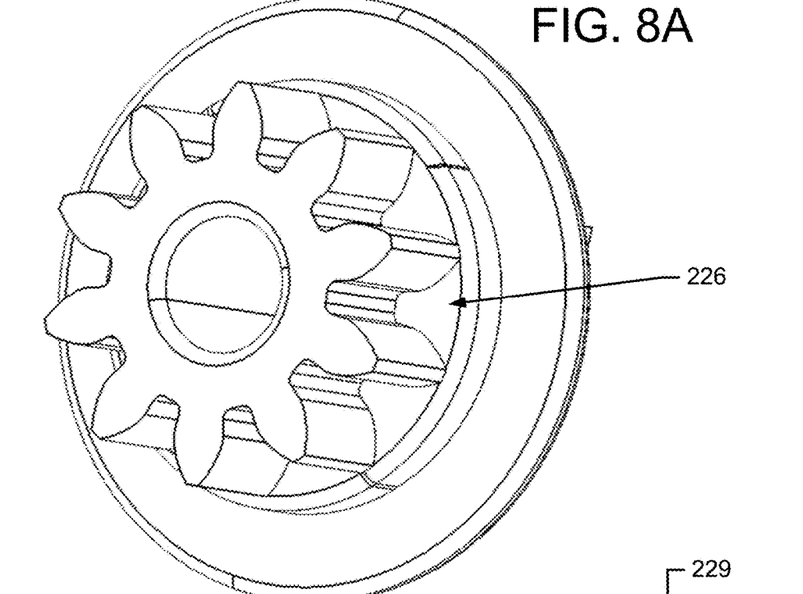
FIG. 8A illustrates a perspective view of a pinion gear of the gear assembly in accordance with an example embodiment.
Figure 8B:
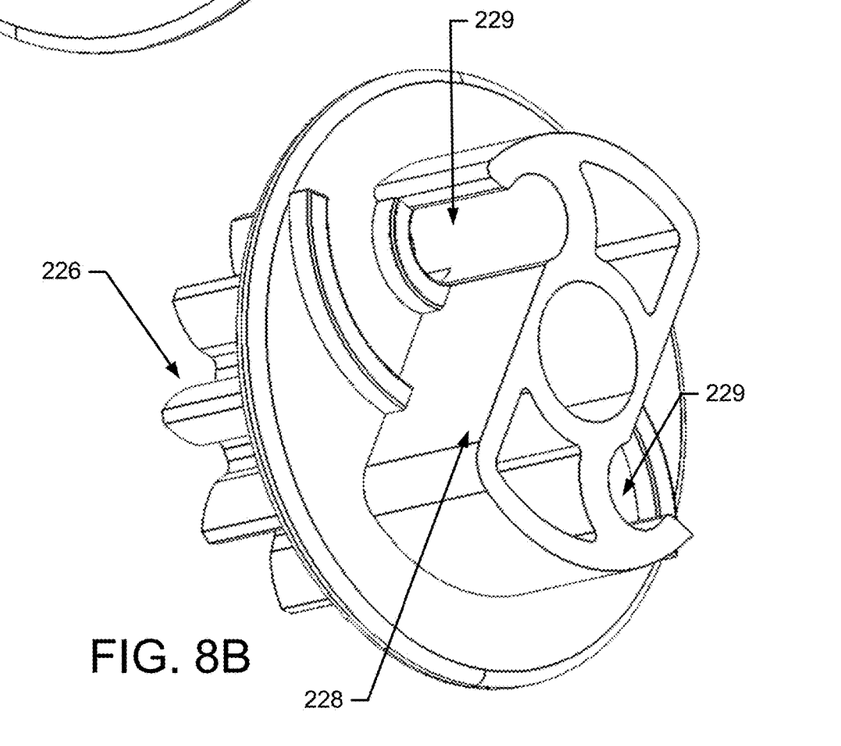
FIG. 8B illustrates a perspective view of an opposite side of the pinion gear of the gear assembly in accordance with an example embodiment.
Figures 9A, 9B:
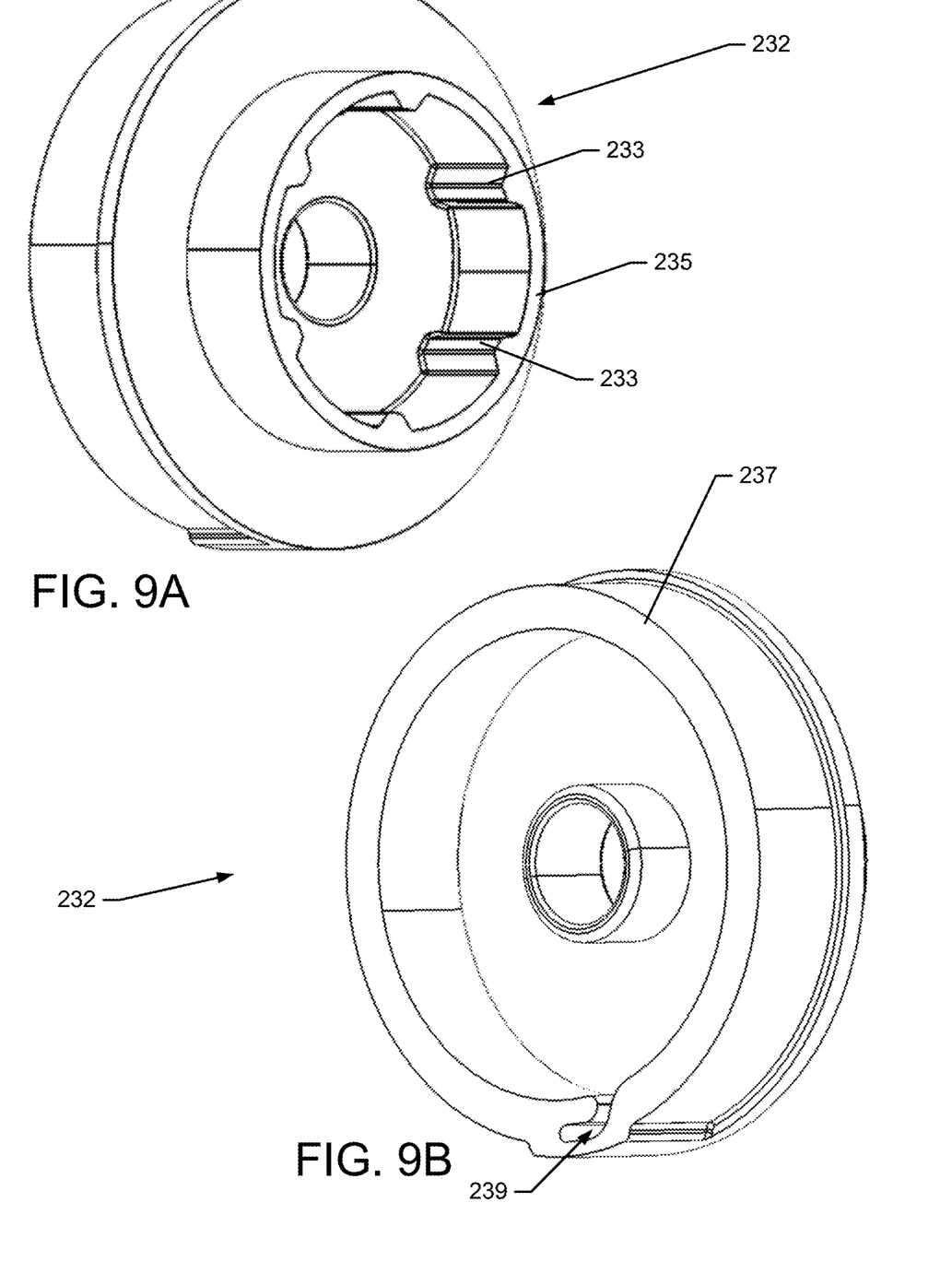
FIG. 9A illustrates a perspective view of a first side of a spring holder of the starting assembly in accordance with an example embodiment.
FIG. 9B illustrates a perspective view of a second side of the spring holder of the starting assembly in accordance with an example embodiment.

FIG. 2 illustrates a block diagram of the starting assembly 200 of an example embodiment, and FIG. 3 illustrates a block diagram of a slightly modified version of the starting assembly 200', which is configured for easier starting. Various components of the example of FIG. 2 are shown in FIGS. 4-9. In this regard, FIG. 4 illustrates a perspective view of various components of the starting assembly 200 with some housing portions removed by taking a cross section through various cover components to enable viewing access to certain components inside. FIG. 5 illustrates a shift in perspective relative to FIG. 4, but is otherwise a cross section view taken along the same cross section plane from FIG. 4. FIG. 6 illustrates a perspective view of the starting lever 210 of an example embodiment. FIG. 7 illustrates a perspective view of a bull gear from a gear assembly of the starting assembly 200. FIG. 8 illustrates a perspective view of a pinion gear of the gear assembly, and FIG. 9 (which includes FIGS. 9A and 9B) illustrates perspective views of a hub of the starting assembly.

As shown in FIGS. 2 and 3, the gear assembly 220 is operably coupled to a ratcheting assembly 240 via a spring assembly 230 or 230'. The spring assembly 230 or 230' and the ratcheting assembly 240 are then operably coupled to crank shaft 250 to start the engine 120 as described in greater detail below. The spring assembly 230' of FIG. 3 may differ from that of FIG. 2 in that the spring assembly 230 of FIG. 2 may include materials for the spring and other components that are sufficient to store enough energy to overcome compression for starting the engine 120 without additional assistance. However, the spring assembly 230 may include a button or other release mechanism to continue to store energy in the spring of the spring assembly until the button or release mechanism is activated. Activation may release the spring and the spring may be sufficient to overcome compression and start the engine 120.

Meanwhile, the spring assembly 230' of FIG. 3 may incorporate an additional component or assembly (e.g., a compression release assembly 260) that may be configured to assist in starting the engine 120. The compression release assembly 260 may provide an "easy start" feature for the engine 120, and may include, for example, a special cam that holds an engine valve open to avoid the need to overcome compression. The cam may be deactivated at the end of the rotation of the starting lever 210 so the engine 120 fires and then continues to run.

Referring now to FIGS. 4-9, the starting lever 210 may include a lever handle or lever arm 212 that extends radially away from an axis formed by axial member 214. A proximal end of the lever arm 212 may engage a distal end of the axial member 214. Although shown in FIG. 4 to extend perpendicular to each other, the lever arm 212 and the axial member 214 need not necessarily form a right angle relative to each other. Moreover, in some cases, the lever arm 212 may be extendible or retractable so that the lever arm 212 only extends fully when positioned by the user for starting operations. For example, the lever arm 212 could telescopically extend or retract, or a portion of the lever arm 212 may be folded alternately (via a hinge) between an extended position (for starting operations) and a retracted position (for storage or during blower operation). In some cases, the lever arm 212 may not extend forward past the forward-most portions of the backpack harness 130 (or a plane thereof) when in the retracted position. However, the lever arm 212 may extend past the forward-most portions of the backpack harness 130 (or the plane thereof) when in the extended position.

As shown in FIGS. 4-6, a proximal end of the axial member 214 may include a set of gear teeth provided as part of a bevel gear 216. The bevel gear 216 provides the interface between the starting lever 210 and the gear assembly 220. The gear assembly 220 may include a bull gear 222 shown in detail in FIG. 7. The bull gear 222 includes a set of bevel gear teeth 224 that interface with the bevel gear 216 of the starting lever 210. The bull gear 222 is operably coupled to a pinion gear 226 of the gear assembly 220.

The pinion gear 226, which is shown in FIG. 8A, may include a ratchet interface 228 on an opposing side thereof, as shown in FIG. 8B. The ratchet interface 228 may in turn interface with a spring holder 232 shown in FIGS. 9A and 9B. The ratchet interface 228 may include slots 229 via which pawls 236 (see FIG. 5) may interface with protrusions 233 located at an interior portion of a first annular projection 235 of the spring holder 232. The pawls 236 and protrusions 233 may allow rotation of the spring holder 232 with the pinion gear 226 when moving in one direction (e.g., clockwise), but disengage to prevent any motion when moving in the opposite direction (e.g., counterclockwise). A second annular projection 237 of the spring holder 232 may include a spring anchor 239 to which the spring 234 of the spring assembly 230 is connected and anchored. The second annular projection 237 extends in an opposite direction with respect to the direction of extension of the first annular projection 235 and may have a smaller diameter than the first annular projection 235.

Figure 10A:
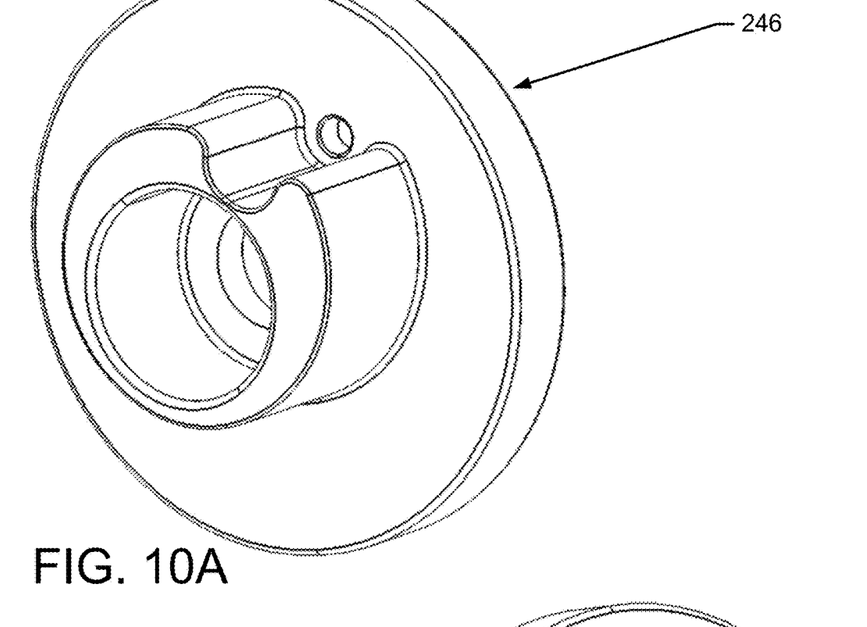
FIG. 10A illustrates a perspective view of a first side of a hub of the starting assembly in accordance with an example embodiment.
Figure 10B:
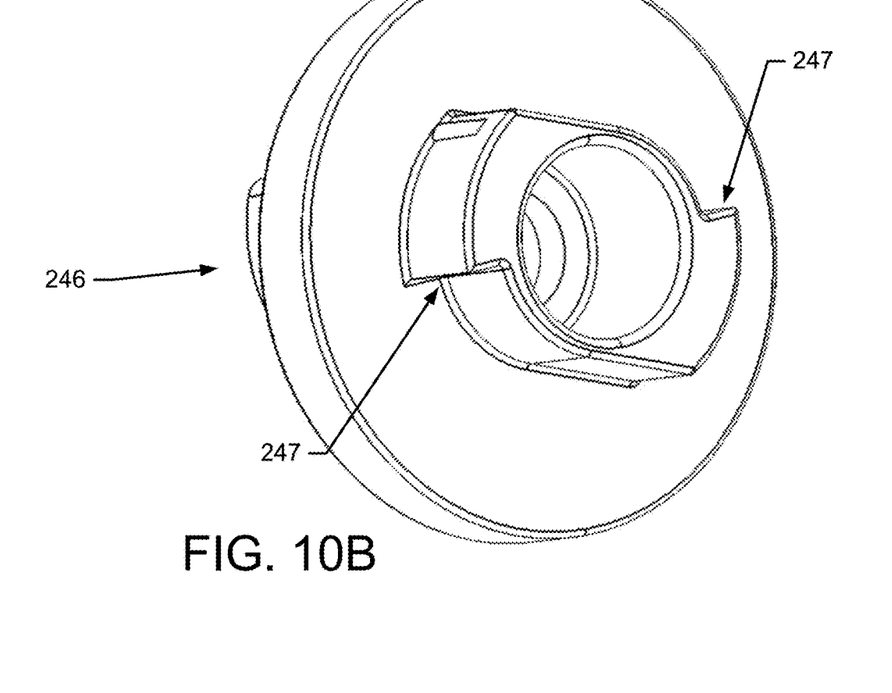
FIG. 10B illustrates a perspective view of a second side of the hub of the starting assembly in accordance with an example embodiment.

A main shaft 244 may pass from the ratchet interface 228 through the spring holder 232 to a hub 246 shown in FIGS. 10A and 10B. In this regard, the hub 246 has a first side (shown in FIG. 10A) that faces the spring holder 232, and a second side (shown in FIG. 10B) that faces a ratchet housing 248. The hub 246 may interface with the ratchet housing 248, which is operably coupled to the crank shaft 250. The hub 246 may also interface with the spring holder 232 and the spring 234 (e.g., a clock spring), which may be disposed in a space located between the hub 246 and the spring holder 232, and be anchored to each at opposing ends thereof. The spring holder 232 may include a one way bearing (e.g., provided by the interface between the pawls 236 and the protrusions 233) so that the spring 234 can be would up in only one direction to store energy as described above. As the spring holder 232 is turned responsive to movement of the gear assembly 220 when the starting lever 210 is operated (i.e., pivoted about the axial member 214) for starting, tension may be built up in the spring 234 and pawls 236 may engage the spring holder 232 (via protrusions 233). Meanwhile, when the starting lever 210 is operated in the opposite direction to the normal direction achieved by pivoting the starting lever 210, the spring holder 232 may not move. The tension continues to build up in the spring 234 during a single operation of the starting lever 210 or via multiple operations thereof until the tension accumulated overcomes compression for the engine 120. At that point, the spring 234 unloads by spinning the hub 246 and the crank shaft 250 via operable coupling between the hub 246 and the ratchet housing 248 (e.g., via pawl 249 engaging one of the projections 247 on the second side of the hub 246). The spinning of the crank shaft 250 then overcomes engine compression to start the engine 120. Inertia created from spinning of the crank shaft 250 during operation then causes disengagement of the ratchet housing 248 from the hub 246 (e.g., by spring loaded disengagement of the pawl 249 due to the inertia of the spinning crank shaft 250 overcoming the force of the spring that loads the pawl 249).

As noted above, rather than having to doff the blower 100 to restart the engine 120, the user can simply pivot the starting lever 210 while still wearing the blower 100. In the example of FIG. 1, if it is assumed that the user can reach the starting lever 210 with his/her left hand, then the user would quickly push the starting lever downwardly (i.e., in the direction of arrow 300) one or more times. The starting lever 210 can also (if needed) be pivoted upward (i.e., in the direction opposite the direction of arrow 300) to reset the starting lever 210 for another crank or start attempt. The rotation of the starting lever 210 causes the bull gear 222 to rotate (via engagement of the bevel gear 216) with bevel gear teeth 224 of the bull gear 222. The rotation of the bull gear 222 causes rotation of the pinion gear 226, which rotation is coupled to the spring holder 232 via the ratchet interface 228 and the pawls 236. Rotation of the spring holder 232 causes tensioning of the spring 234 (via one or more downward pivots of the starting lever 210) until the hub 246 is ultimately turned due to sufficient spring pressure being built up (e.g., when compression of the engine 120 is overcome) to unload the spring 234 and start the engine 120 by turning the crank shaft 250. Example embodiments may therefore allow the user to easily start the engine 120 without doffing the blower 100 and by instead using an intuitive motion that is easy to repeat while the blower 100 is donned.

A blower of an example embodiment may therefore include a housing, a backpack harness operably coupled to the housing to support the blower on a back of a user wearing the backpack harness, an engine operably coupled to the housing, a fan assembly operably coupled to the engine to force air through a blower tube responsive to operation of the engine, and a starting assembly comprising a starting lever that is pivotable by a user wearing the blower via the backpack harness to start the engine.

The blower of some embodiments may additional features, modifications, augmentations and/or the like to achieve further objectives or enhance operation of the blower. Similarly, the starting system described above may include additional features, modifications, augmentations and/or the like. The additional features, modifications, augmentations and/or the like may be added in any combination with each other. For example, in some examples, the starting lever may include a lever arm operably coupled to an axial member at a distal end of the axial member, the backpack harness may meet the back of the user at an interface plane, and the lever arm may extend through the interface plane. In some cases, the lever arm is extendible and retractable through the interface plane. In an example embodiment, the starting lever is configured to interface with a gear assembly. The gear assembly may be operably coupled to the spring assembly and a ratcheting assembly, and the spring assembly may be configured to accumulate tension responsive to rotation of the gear assembly in response to pivoting of the lever arm based on operation of the ratcheting assembly. The spring assembly may also be configured to release the accumulated tension to turn a crank shaft of the engine and start the engine. In some examples, the spring assembly may be configured to release the accumulated tension automatically in response to the accumulated tension exceeding compression of the engine. In an example embodiment, the spring assembly may be operably coupled to a compression release assembly configured to assist starting the engine based on the accumulated tension. In some cases, the starting lever may include a lever arm operably coupled to an axial member at a distal end of the axial member, and a bevel gear may be disposed at a proximal end of the axial member to interface with beveled teeth on a bull gear of the gear assembly. In an example embodiment, the bull gear may be operably coupled to a pinion gear having a ratchet interface operably coupled to a spring holder that rotates to cause the accumulated tension to build up in a spring of the spring assembly. In some cases, the spring holder may be operably coupled to a hub of the ratchet assembly configured to release the accumulated tension from the spring through the hub to turn the crank shaft in response to the accumulated tension exceeding compression of the engine. In an example embodiment, the spring holder may be configured to be driven by movement in a first direction responsive to operation of the lever arm and disengage from the lever arm responsive to movement of the lever arm in a second direction, and the hub may be configured to be disengaged from the crank shaft responsive to rotation of the crank shaft during operation of the blower.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A blower comprising:
a housing;
a backpack harness operably coupled to the housing to support the blower on a back of a user wearing the backpack harness;
an engine operably coupled to the housing;
a fan assembly operably coupled to the engine to force air through a blower tube responsive to operation of the engine; and
a starting assembly comprising a starting lever comprising a lever arm operably coupled to an axial member at a distal end of the axial member, and the lever arm extends radially away from an axis formed by the axial member, wherein the axial member includes a set of gear teeth at a proximal end of the axial member interfaced with a gear assembly, and the starting lever is pivotable about the axis by a user wearing the blower via the backpack harness to start the engine.

2. The blower of claim 1,
wherein the backpack harness meets the back of the user at an interface plane, and
wherein the lever arm extends through the interface plane.

3. The blower of claim 2, wherein the lever arm is extendible and retractable through the interface plane.

4. The blower of claim 1, wherein the gear assembly,
wherein the gear assembly is operably coupled to a spring assembly and a ratcheting assembly,
wherein the spring assembly is configured to accumulate tension responsive to rotation of the gear assembly in response to pivoting of the lever arm based on operation of the ratcheting assembly, and
wherein the spring assembly is configured to release the accumulated tension to turn a crank shaft of the engine and start the engine.

5. The blower of claim 4, wherein the spring assembly is configured to release the accumulated tension automatically in response to the accumulated tension exceeding compression of the engine.

6. The blower of claim 4, wherein the spring assembly is operably coupled to a compression release assembly configured to assist starting the engine based on the accumulated tension.

7. The blower of claim 4,
wherein a bevel gear including the set of gear teeth is disposed at the proximal end of the axial member to interface with beveled teeth on a bull gear of the a gear assembly.

8. The blower of claim 7, wherein the bull gear is operably coupled to a pinion gear having a ratchet interface operably coupled to a spring holder that rotates to cause the accumulated tension to build up in a spring of the spring assembly.

9. The blower of claim 8, wherein the spring holder is operably coupled to a hub of the ratchet assembly configured to release the accumulated tension from the spring through the hub to turn the crank shaft in response to the accumulated tension exceeding compression of the engine.

10. The blower of claim 9, wherein the spring holder is configured to be driven by movement in a first direction responsive to operation of the lever arm and disengage from the lever arm responsive to movement of the lever arm in a second direction, and
wherein the hub is configured to be disengaged from the crank shaft responsive to rotation of the crank shaft during operation of the blower.

11. A starting assembly for a backpack blower, the backpack blower comprising an engine and a backpack harness configured to support the blower on a back of a user wearing the backpack harness, the starting assembly comprising:
a starting lever comprising a lever arm operably coupled to an axial member at a distal end of the axial member, and the lever arm extends radially away from an axis formed by the axial member, wherein the axial member includes a set of gear teeth at a proximal end of the axial member interfaced with a gear assembly, and the starting lever is pivotable about the axis formed by the axial member by a user wearing the blower via the backpack harness to start the engine.

12. The starting assembly of claim 11, wherein the backpack harness meets the back of the user at an interface plane, and
wherein the lever arm extends through the interface plane.

13. The starting assembly of claim 12, wherein the lever arm is extendible and retractable through the interface plane.

14. The starting assembly of claim 11, wherein the starting lever is configured to interface with a gear assembly,
wherein the gear assembly is operably coupled to a spring assembly and a ratcheting assembly,
wherein the spring assembly is configured to accumulate tension responsive to rotation of the gear assembly in response to pivoting of the lever arm based on operation of the ratcheting assembly, and
wherein the spring assembly is configured to release the accumulated tension to turn a crank shaft of the engine and start the engine.

15. The starting assembly of claim 14, wherein the spring assembly is configured to release the accumulated tension automatically in response to the accumulated tension exceeding compression of the engine.

16. The starting assembly of claim 14, wherein the spring assembly is operably coupled to a compression release assembly configured to assist starting the engine based on the accumulated tension.

17. The starting assembly of claim 14, wherein a bevel gear including the set of gear teeth is disposed at the proximal end of the axial member to interface with beveled teeth on a bull gear of the gear assembly.

18. The starting assembly of claim 17, wherein the bull gear is operably coupled to a pinion gear having a ratchet interface operably coupled to a spring holder that rotates to cause the accumulated tension to build up in a spring of the spring assembly.

19. The starting assembly of claim 18, wherein the spring holder is operably coupled to a hub of the ratchet assembly configured to release the accumulated tension from the spring through the hub to turn the crank shaft in response to the accumulated tension exceeding compression of the engine.

20. The starting assembly of claim 19, wherein the spring holder is configured to be driven by movement in a first direction responsive to operation of the lever arm and disengage from the lever arm responsive to movement of the lever arm in a second direction, and
wherein the hub is configured to be disengaged from the crank shaft responsive to rotation of the crank shaft during operation of the blower.

21. A blower comprising:
a housing;
a backpack harness operably coupled to the housing to support the blower on a back of a user wearing the backpack harness;
an engine operably coupled to the housing;
a fan assembly operably coupled to the engine to force air through a blower tube responsive to operation of the engine; and
a starting assembly comprising a starting lever is pivotable by a user wearing the blower via the backpack harness to start the engine;
wherein the starting lever is configured to interface with a gear assembly,
wherein the gear assembly is operably coupled to a spring assembly and a ratcheting assembly,
wherein the spring assembly is configured to accumulate tension responsive to rotation of the gear assembly in response to pivoting of the lever arm based on operation of the ratcheting assembly, and
wherein the spring assembly is configured to release the accumulated tension to turn a crank shaft of the engine and start the engine.

* * * * *